US009798015B2

(12) United States Patent
Gogliettino

(10) Patent No.: US 9,798,015 B2
(45) Date of Patent: Oct. 24, 2017

(54) METHOD AND APPARATUS FOR PREDICTING THE ORBIT AND DETECTING THE TYPE OF A SATELLITE

(71) Applicant: STMicroelectronics S.r.l., Agrate Brianza (MB) (IT)

(72) Inventor: Giovanni Gogliettino, Napoli (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 632 days.

(21) Appl. No.: 14/461,568

(22) Filed: Aug. 18, 2014

(65) Prior Publication Data

US 2015/0091753 A1 Apr. 2, 2015

(30) Foreign Application Priority Data

Aug. 29, 2013 (IT) .............................. MI2013A1424

(51) Int. Cl.

*G01S 19/27* (2010.01)
*B64G 3/00* (2006.01)
*B64G 1/10* (2006.01)
*B64G 1/24* (2006.01)

(52) U.S. Cl.

CPC ................ *G01S 19/27* (2013.01); *B64G 3/00* (2013.01); *B64G 1/1085* (2013.01); *B64G 1/242* (2013.01)

(58) Field of Classification Search

CPC .................................. G01S 19/27; B64G 3/00
See application file for complete search history.

(56) References Cited

U.S. PATENT DOCUMENTS 5,909,381 A 6/1999 Shome et al.
8,125,382 B2 2/2012 Derbez
8,228,230 B1 7/2012 Capozio
2002/0188403 A1 12/2002 LaMance et al.
2012/0056782 A1* 3/2012 McBurney ............. G01S 19/27
342/357.66

FOREIGN PATENT DOCUMENTS

EP 2063824 A2 9/2008
EP 2063284 5/2009

OTHER PUBLICATIONS

Italian Search Report and Written Opinion dated Jan. 24, 2014 from corresponding Italian Application No. MI2013A001424.
Bar-Sever, D. Kuang, "New Empirically Derived Solar Radiation Pressure Model for Global Positioning System Satellites," IPN Progress Report 42-159, Nov. 15, 2004, pp. 1-11.

* cited by examiner

*Primary Examiner* — Cassie Galt
(74) *Attorney, Agent, or Firm* — Slater Matsil, LLP

(57) ABSTRACT

A method of predicting the orbit of a satellite of a satellite positioning system, including: associating first and second types of satellites with first and second models of celestial mechanics forces, respectively; storing first ephemerides data of a satellite, associated to first time intervals and second ephemerides data associated to second time intervals. Further, the method comprises: calculating reference satellite positions based on the first ephemerides data; estimating first and second satellite positions in the first time intervals by using the second ephemerides data and the first and second forces models, respectively; determining first and second estimate errors by comparing the reference positions with the first and second positions, respectively; and detecting the type of satellite between the first and second types by an analysis of the first and second errors.

19 Claims, 3 Drawing Sheets

METHOD AND APPARATUS FOR PREDICTING THE ORBIT AND DETECTING THE TYPE OF A SATELLITE

CROSS REFERENCE TO RELATED APPLICATIONS

This application claims the priority benefit of Italian Patent Application No. MI2013A001424, filed Aug. 29, 2013, and which application is hereby incorporated by reference to the maximum extent allowable by law.

BACKGROUND

Technical Field

The present disclosure refers to the satellite positioning systems, and particularly refers to the prediction of satellite orbits.

Discussion of the Related Art

As is known, a GNSS (Global Navigation Satellite System) receiver, for example a GPS (Global Positioning System), for calculating its position, receives correctly formatted electromagnetic signals transmitted by a constellation of satellites orbiting around earth. The receiver position is determined by a triangulation process which requires a rather complex procedure.

Initially, the GPS receiver, by a process known as acquisition, needs to locate a sufficient number of satellites and "hook" to them. However, the GPS receiver for calculating its correct position, needs to know where each of these satellites is positioned in the space, with a high degree of precision.

Each satellite spends 30 seconds for transmitting its navigation message containing its accurate position, and the GPS receiver downloads from each satellite such data, required by the receiver, for calculating the "fix" (that is the position of the receiver itself). These data, known as ephemerides, describe a limited orbit arc and are generally valid only for 4 hours in case of the GPS.

If the reception of this data is interrupted, for example due to a building or tree, the receiver needs to wait additional time to download the missing data from the satellite.

In real conditions, wherein the GPS receiver is often in motion, some minutes are required for the receiver to obtain the availability of all the needed data for making its calculations and obtaining the "fix", this fact causes an extreme uncertainty about the position before the navigation starts.

A possibility of alleviating the above mentioned problem consists of autonomously generating, inside the receiver, the satellites orbit prediction based on previous ephemerides transferred and stored in the receiver memory. It is known that satellite orbit prediction methods are available for GPS and GNSS systems. Those methods can predict such orbits up to several days.

The autonomous prediction of a satellite orbit is becoming an important characteristic of a GNSS receiver. The orbit of each satellite can be estimated by solving a standard problem of celestial mechanics by a suitable degree of knowledge of all the forces (gravitational and non-gravitational forces) acting on the satellite and the so-called Initial Condition, that is the position of a satellite and its speed at a given time instant which are available from present and/or past observations.

Document U.S. Pat. No. 8,228,230 describes a satellite orbit prediction method.

Among the non-gravitational forces acting on a satellite there is the solar radiation pressure due to the solar wind action on a space vehicle as a satellite.

The effect of the solar radiation pressure on the satellite depends on the shape, size and mass of the satellite itself. Since there are different types of satellites having different parameters of size, shape and mass also in the same constellation, the celestial mechanics model used for predicting their orbits should take in account said parameters for predicting the orbits based on a model of the solar radiation pressure which effectively corresponds to the used satellite.

It is observed that the information regarding the type of a satellite is not a datum transmitted by the satellite itself and therefore cannot be available to the receiver. For example, nowadays the GPS system can use satellites of the GPS Block II-A type, or satellites of the GPS Block II-R type, or satellites of the GPS Block II-F type.

The article "New Empirically derived Solar Radiation Pressure model for global Positioning System Satellites" Y. Bar-Sever and D. Kuang, IPN Progress Report 42-159, pages 1-11, 15 Nov. 2004, describes models of the solar radiation pressure useable for Block II-A or BPS Block II-R satellites.

If the orbit of a satellite is predicted in dependence of a solar radiation pressure model referred to another type of satellite, such prediction is affected by an error influencing the position calculation of the receiving apparatus and therefore the fix calculation.

SUMMARY

The Applicant observes that the prediction of the satellites orbits performed according to the known techniques can be affected by errors due to the fact that such prediction is performed by considering a celestial mechanics model which, specifically referring to the action of the solar radiation pressure, is not suitable to the actually used satellite.

According to an embodiment, there is provided a method of predicting an orbit of a satellite of a satellite positioning system, comprising: associating first and second models of celestial mechanics forces with first and second types of satellites, respectively; storing first ephemerides data of a satellite, associated with first time intervals, and second ephemerides data of the satellite, associated with second time intervals distinct from the first time intervals; calculating reference positions of the satellite based on the first ephemerides data; estimating first and second satellite positions in the first time intervals by using the second ephemerides data and the first and second forces models, respectively; determining first and second estimated errors by comparing the reference positions with the first and second positions, respectively; and detecting the type of satellite between the first and second types by an analysis of the first and second errors.

According to an embodiment, the method further comprises performing predictions of the satellite orbit by using one among the first and second forces models as a function of the detected type of satellite.

According to an embodiment, the first time interval is before the second time interval.

According to an embodiment, first and second satellite types are respectively associated with a first shape and/or size and/or mass of the satellite and to a different second shape and/or size and/or mass of the satellite.

According to an embodiment, first and second celestial mechanics forces models are dependent on a respective solar radiation pressure model acting on the satellite of the first and second types.

According to an embodiment, detecting the type of satellite comprises: signaling the succeeded detection of the type; and signaling a failed detection of the type.

According to an embodiment, said analysis of the first and second errors comprises: selecting at least one first maximum error among said first errors in absolute value and at least a second maximum error among said second errors in absolute value; comparing the first maximum error with the second maximum error and identifying a first smaller value among said first and second maximum errors; selecting the first or second type as a function of said minimum value identification.

According to an embodiment, the method further comprises defining the absolute value of a first difference between the first maximum error and second maximum error; comparing the absolute value of the first difference with a first threshold value; signaling the succeeded or failed detection of the type based on said comparison.

According to an embodiment, the method further comprises selecting at least one first sub-maximum error defined as a maximum value among said first errors in absolute value devoid of the first maximum error and at least one second sub-maximum error defined as a relative maximum value among said second errors in absolute value devoid of the second maximum error.

According to an embodiment, the method further comprises comparing the first sub-maximum error with the second sub-maximum error and identifying a second smaller value between said first and second maximum errors; signaling a failed detection of the type if the first minimum value and the second minimum value are associated different types of satellites.

According to an embodiment, the method further comprises defining the absolute value of a second difference between the first sub-maximum error and second sub-maximum error; comparing the absolute value of the second difference with a second threshold value; signaling the succeeded or failed detection of the type based on said comparison of the second difference with the second threshold value.

According to an embodiment, the first and second errors comprise first and second radial errors.

According to an embodiment, the method further comprises obtaining a plurality of results of succeeded detection wherein one between the first and second types is selected and a plurality of results of failed detection; said plurality of results being relative to partially overlapping and time forward shifted time intervals; selecting a result among the pluralities of results of succeeded detection and failed detection having a greater recurrence.

According to an embodiment, there is provided a method of detecting a type of a satellite of a satellite positioning system, comprising: associating first and second celestial mechanics force models with first and second types of satellites, respectively; storing first ephemerides data of a satellite, associated with a first time interval, and second ephemerides data of the satellite, associated with a second time interval distinct from the first time interval; calculating reference positions of the satellite based on the first ephemerides data; estimating first and second satellite positions in the first time intervals by using the second ephemerides data and the first and second forces models, respectively; determining first and second estimate errors by comparing the reference positions with the first and second positions, respectively; and detecting the type of the satellite between the first and second type by an analysis of the first and second errors.

According to an embodiment, there is provided receiving apparatus of a satellite positioning system, comprising: a prediction module configured to perform predictions about the orbit of a satellite by using one between a first model of celestial mechanics forces and a second models of celestial mechanics forces; a module for detecting a type of the satellite comprising: a first module configured to associate with first and second satellite types, a first and second models of celestial mechanics forces, respectively; a second module configured to store first ephemerides data of a satellite associated with first time intervals, and second ephemerides data of the satellite associated with second time intervals distinct from the first time intervals, a third module configured to calculate reference positions of the satellite based on the first ephemerides data, a fourth module configured to estimate first and second positions of the satellite in the first time intervals by using the second ephemerides data and the first and second forces models, respectively; a fifth module configured to determine first and second estimate errors by comparing the reference positions with first and second positions, respectively; a sixth module configured to detect the type of the satellite between the first and second type by an analysis of first and second errors; a seventh module configured to arrange the prediction module in order to use a model of celestial mechanics associated to the type of the satellite, as detected.

BRIEF DESCRIPTION OF THE DRAWINGS

In order to better understand the embodiments and appreciate the advantages, in the following some embodiments thereof will be described in a non-limiting exemplifying way with reference to the attached drawings, wherein.

DETAILED DESCRIPTION

Figure 1:
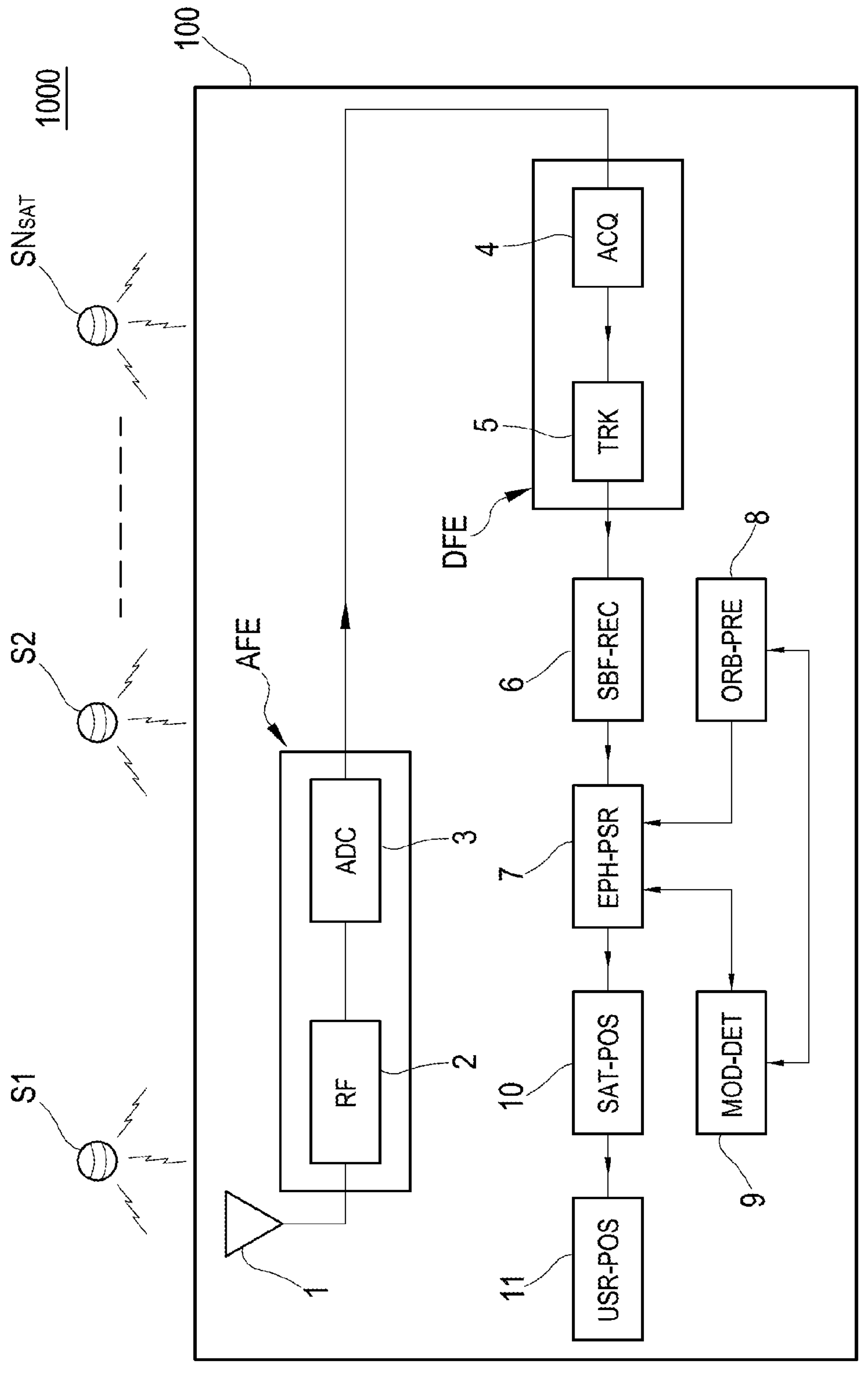
FIG. 1 schematically shows a satellite positioning system comprising a receiving apparatus.

FIG. 1 diagrammatically shows a GNSS system 1000 (Global Navigation Satellite System) such as, for example, Global Positioning System (GPS), Global'naya Navigatsionnaya Sputnikovaya Sistema (GLONASS), Galileo System, or other types of satellite-based positioning systems.

The global satellite positioning system 1000 comprises a constellation of satellites S1-$SN_{sat}$ and at least a receiving apparatus 100. In a particular embodiment, receiving apparatus 100 comprises an antenna 1, an analog receiving module AFE, provided with a radiofrequency (RF) stage 2, and an analog-digital converter 3 (ADC), which can be implemented by hardware modules.

Further, receiving apparatus 100 comprises a digital processing module DFE, including an acquisition module 4 (ACQ), and a tracking module 5 (TRK).

Moreover, receiving apparatus 100 is provided with a sub-frame recovery module (SBF-REC), an ephemerides processing and pseudo-range calculation module 7 (EPH-PSR), a satellites orbits prediction module 8 (ORB-PRE), a satellite type detecting module 9 (MOD-DET), a satellite position calculation module 10 (SAT-POS), and a user position calculation module 11 (USR-POS).

In a particular embodiment, acquisition module 4, tracking module 5 can be implemented by hardware, while the remaining modules 6-10 can be implemented by software. In addition, it is observed acquisition module 4 and tracking module 5 can also be implemented by a hardware and software combination.

Receiving apparatus 100 is provided with a central processing unit, memories (mass memory and/or working storage) and respective interfaces (not shown in figures), comprising a microprocessor or microcontroller, for running the software resident in it.

The following embodiments are described in a non-limiting way referring to the GPS technology, however the teachings of the present disclosure can be applied also to other satellite positioning systems.

When the receiving apparatus 100 operates, an antenna 1 receives a plurality of signals from one or more satellites S1-$SN_{sat}$ of the constellation of satellites operating in system 1000. For example, these signals can be modulated on a carrier having a frequency of about 1.5 GHz. Particularly, each received signal transports a pseudo-random code and a message for the data communication.

The pseudo-random code, known as CA code, for example at 1 MHz, is used for distinguishing a satellite from another, and enables the receiving apparatus 100 to measure the time instant at which has been transmitted a signal by a corresponding satellite. Pseudo-random code is implemented by a sequence of pulses, called chips.

The data navigation message transports data (for example at a bit rate equal to 50 Hz) and particularly is modulated based on the Binary Phase Shift Keying (BPSK) technique. Further, data navigation message is hierarchically divided in frames and sub-frames and transports several information, among them a plurality of parameters used for determining the orbit and consequently the position of satellites.

The radio frequency stage 2 operates on the signals received by antenna 1 (of the analog type) and converts them to the base band or to an intermediate frequency. Analog-digital converter 3 converts the intermediate frequency signals to corresponding digital signals.

Acquisition module 4 enables to detect, based on the digital output signals from the analog-digital converter 3, which satellites in the constellation S1-$SN_{sat}$ are visible, in other words for which satellites it is received a signal adapted to identify it. Further, the acquisition module 4 detects a plurality of parameters associated to the satellites and used for time tracking the satellite.

Tracking module 5 has plural channels, and each is allocated to a different satellite. Specifically, tracking module 5 is configured to operate as a frequency locked loop. Based on a further embodiment, tracking module 5 is configured to implement a phase locked loop.

Tracking module 5 is configured to supply data to the sub-frame recovery module 6, as a time sequence of samples pairs, indicated with {I, Q}. Each sample {I, Q} is for example the result of a coherent integration, respectively in-step and quadrature, of a bit of 20 msec, performed by a correlator based on the modulation technique Binary Phase Shift Keying (BPSK), each samples pair {I, Q} represents a transmitted bit.

As it is known in the field of the digital communication theory, each sample {I, Q} can be further interpreted as a phasor, by considering the value I and value Q as the real and imaginary parts of a bi-dimensional vector in the complex Cartesian plane.

Moreover, for each satellite, in the tracking module 5 the Doppler frequency and the transfer time of the GPS signal transmitted by a satellite S1-$SN_{sat}$ are determined.

The sub-frame recovery module 6, by means of suitable algorithms, decodes the different received sub-frames forming the navigation data message. The ephemerides processing and pseudo-range calculation module 7 stores the satellite orbit, as ephemerides data and calculates the existent distances between the satellites and receiving apparatus 100: such distances are called pseudo-range. By these calculated values, and the time for transferring the GPS signal, the satellite position calculation module 10 calculates the positions of the satellites expressed by 3D coordinates, at the moment of transmission.

The satellite orbit prediction module 8 can be activated for assisting the ephemerides processing and pseudo-range calculation module 7 and/or satellite position calculation module 10 when the ephemerides data are not available at the receiving apparatus 100.

The satellite type detecting module 9 is configured to determine the type of the tracked satellite and by it the solar radiation pressure model to be used in the orbit prediction by the satellite orbit prediction module 8, according to modes that will be described in the following as examples. The satellite type detecting module 9 enables to determine the type of satellite in order to select the solar radiation pressure model which better provides for the shape, mass and size of a satellite.

In this embodiment, the satellite position calculation module 10 operates on the time for transferring the GPS signal together with the reception time (known due to a clock inside the receiving apparatus 100). The satellite position calculation module 10 operates in order to evaluate how much time is required to the signal from each satellite for reaching the receiving apparatus 100, evaluating in this way the distance from the corresponding satellite (pseudo-range).

By a triangulation algorithm, the user position calculation module 11 calculates the position of the receiving apparatus 100 based on the distances of the receiving apparatus 100 preferably from at least four satellites and based on the positions of the same satellites, known at this processing stage. In the following, the position of the receiving apparatus 100 (practically coinciding with the user position) will be called "fix".

Figure 2:
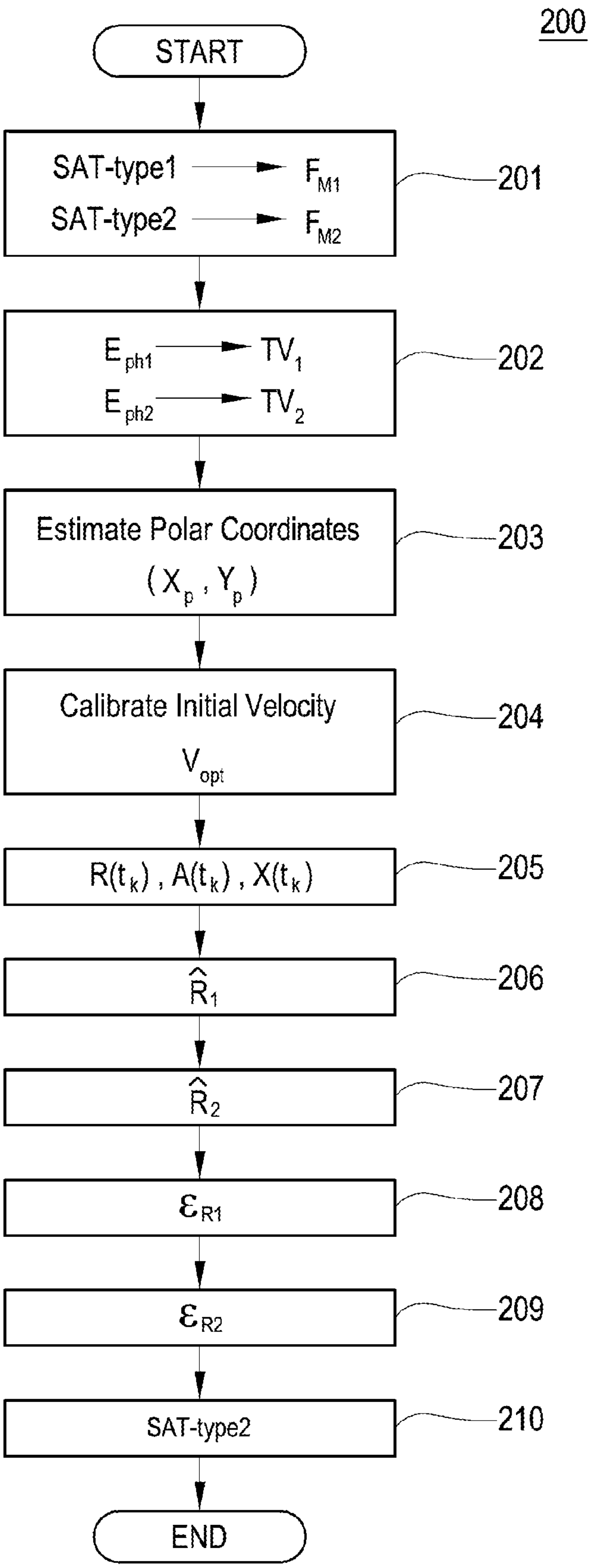
FIG. 2 is a flow diagram of an exemplifying method of detecting the type of a satellite.

With reference to FIG. 2, it is described by a flow diagram an example of a method of detecting the type of satellites 200 which can be implemented by the satellite type detecting module 9.

It is considered the case wherein the satellite acquired by the acquisition module 4 is the first satellite S1 of constellation S1-SNsat, and receiving apparatus 100 does not know the type of such first satellite S1.

Specifically, first satellite S1 can be of a first type, in other words it has some characteristics of shape and/or size and/or mass, or of a second type having different characteristics of shape and/or size and/or mass. There is also the case wherein the possible types of satellites useable and to be detected can be more than two.

After a symbolic start step (START), detecting method 200 comprises a first storing step 201 which stores a first model of celestial mechanics forces, associated with the first type, and a second model of celestial mechanics forces, associated with the second type of satellites.

The model of celestial mechanics forces can be represented by the following formula (1):

$$\sum_{i=1}^{M} F_i(t, \underline{r}, \underline{v}) \quad (1)$$

wherein each force $F_1$ represents a gravitational or non-gravitational force. For example, the M-th force $F_M(\ )$ refers to the solar radiation pressure and can take a first form $F_{M1}(\ )$ adapted to the first type of satellite (SAT-type 1, in FIG. 2), or a second form $F_{M2}(\ )$ adapted to the second type of satellite (SAT-type 2).

In formula (1), vectors r, v, $\ddot{r}$ are respectively the position, speed and acceleration vectors of the satellite subject to the set of forces$_{F1 \ldots FM}$.

Detecting method 200 continues to a second storing step 202 wherein the first ephemerides data $Eph_1$ of the satellite, associated with a first time interval $TV_1$ and second ephemerides data Eph2 of the satellite, associated with a second time interval $TV_2$ different from the first time interval, are stored. Particularly, first time interval is after second time interval. As it is known, an ephemeris comprises data describing a limited portion of an orbit, such as for example, an orbit arc, and has a validity of four hours in case of GPS.

Specifically, according to the example of FIG. 2, detecting method 200 can further comprise an optional step of estimating the polar coordinates 203 (Estimate Polar Coordinates) wherein it is performed an estimate of the terrestrial polar coordinates ($x_p$, $y_p$) to be used in the transformation from the ECEF (Earth-Centered Earth-Fixed) coordinate system to ECI (Earth Centered Inertial) coordinate system.

Further, according to the particular described example, there is performed a calibration step 204 (Calibrate Initial Velocity) wherein the initial speed of first satellite S1 is determined. Specifically, this calibration step 204 is applied to second ephemerides data Eph2 which will be used, as explained in the following, for an estimate step. Such calibration 204 can also be performed, besides on the second ephemerides data, also on other ephemerides data, in order to improve the estimate which will be calculated in the following. It is observed that the initial position of the first satellite S1 is supplied to the receiving apparatus 100 from the first satellite S1 itself.

Detecting method 200 therefore advances with reference to the GPS system with a reference position calculation step 205 wherein the coordinates of the positions taken by the first satellite S1 at the first ephemerides data $Eph_1$ of the first satellite S1 at least for the first time interval $TV_1$ are calculated.

According to an example, the reference position calculation step 205 calculates the following coordinates of the first satellite S1 at intervals for all the duration of the first time interval $TV_1$.

The coordinates associated with the first positions estimated in the first estimate step 206 can be expressed as indicated in the following by the formula (2):

$$\vec{R}(t_k), t_k \in TV_1 \quad (2)$$

The vector quantity $\vec{R}(t_k)$ represents a position vector of the first satellite S1, such as for example, a vector having origin in the center of the earth and vertex in the satellite itself. In a first estimate step 206, first positions taken by the first satellite in first time interval $TV_1$ are estimated by the second ephemerides data $Eph_2$ associated to the second time interval $TV_2$. For example, such first estimate step is performed by a back-propagation, from the second time interval $TV_2$ to the first time interval $TV_1$, of the second ephemerides $Eph_2$ by considering the model of the celestial mechanics forces which provides for the first form $F_{M1}(\ )$ of the solar radiation pressure adapted to the first satellite type. Such estimate is calculated by solving formula (1) obtaining the following formula (3):

$$\ddot{\underline{r}} = \frac{\sum_{i=1}^{M} F_i(t, \underline{r}, \underline{v})}{m} \quad (3)$$

The formal solution of formula (3) is:

$$\underline{r}(t) = \underline{r}_0 + \underline{v}_0 t + \frac{1}{m} \int_{t_0}^{t} \int_{t_0}^{t} \sum_{i=1}^{M} F_i(t, \underline{r}, \underline{v}) dt \quad (4)$$

wherein $\{r_0, v_0\}$ are respectively the initial position and initial speed of first satellite S1 and m is the mass of first satellite S1.

Particularly, such back-propagation is performed by an integration of the forces system which can be calculated by standard numerical calculation procedures, such as for example, the Runge-Kutta, Adam-Bashford procedures or other numerical algorithm. In such back-propagation, time variable t is considered in the past with respect to time $t_0$. According to another embodiment, instead of a back-propagation, there is calculated a forward estimate, that is a forward-propagation of the first time interval $TV_1$ to the second time interval $TV_2$ (by inverting, in such case, the role of the ephemerides $Eph_1$ and $Eph_2$).

The coordinates associated with the first estimated positions of the first estimate step 206 can be expressed as indicated in the following by the formula (5):

$$\vec{R}_1(t_k), t_k \in TV_1 \quad (5)$$

In a second estimate step 207, second positions, taken by the first satellite S1 in the first time interval $TV_1$ are estimated by employing the second data of ephemerides $Eph_2$ associated to the second time interval $TV_2$, by considering the model of the celestial mechanics forces which considers the second form $F_{M2}(\ )$ of the solar radiation pressure suitable to the second satellite type. Such second estimate 207 is performed by solving formula (3) analogously to what has been described with reference to the first estimate step 206.

The coordinates associated with the second estimated positions in the second estimate step 207 can be expressed as indicated in the following by the formula (6):

$$\vec{R}_2(t_k), t_k \in TV_1 \quad (6)$$

Detecting method 200 continues to a first error calculation step 208 which calculates a plurality of first radial errors $\epsilon_{R1}$ obtained as the radial component of the differences between the coordinates of the reference positions R and coordinates of temporally corresponding positions $R_1$:

$$\epsilon_{R1}(t_k) = (\vec{R}(t_k) - \vec{R}_1(t_k)) \cdot \hat{r}, t_k \in TV_1 \quad (7)$$

(wherein $\hat{r}$ is the radial versor).

For example, in the first time interval $TV_1$ of 4 hours, fifteen values of the first error separated by 15 minutes one from the other are calculated.

Moreover, in second error calculation step 209, a plurality of second radial errors $\epsilon_{R2}$ obtained as the radial component of the differences between the coordinates of the reference positions R and coordinates of second positions $R_2$ are calculated:

$$\epsilon_{R2}(t_k)=(\vec{R}(t_k)-\vec{R}_2(t_k))\cdot\hat{r};t_k\epsilon TV_1 \quad (8)$$

In an analysis step 210, an analysis of first errors $\epsilon_{R1}$ and second errors $\epsilon_{R2}$ is performed and based on the latter the type of the first satellite S1 is detected, for example it is detected the second type SAT-type2.

The previously described steps of the detecting method 200 can be repeated, for example, periodically (for example, once a week) for a predetermined period of time, for example 4 months).

It is observed the detection of the type of first satellite which ended with the analysis step 209, enables to identify as a model of the solar radiation pressure the second model $F_{M2}(\ )$ The satellite type detecting module 9 communicates to the satellite orbit prediction module 8 such second determined model of the solar radiation pressure.

Therefore, the satellite orbit prediction module 8 can perform the predictions regarding the first satellite S1, by using and solving the model of the celestial mechanics forces, expressed by formula (3), wherein the second model $F_{M2}(\ )$ is used for the solar radiation pressure. For example, the satellite orbit prediction module 8 can use the prediction method described in the above mentioned document of Y. Bar-Sever and D. Kuang of 15 Nov. 2004.

The described method can be applied not only for determining the model of forces which better represents the effects of the solar radiation pressure but can be used also with reference to other types of forces acting on the satellite and which depend on its shape and/or mass.

Figure 3:
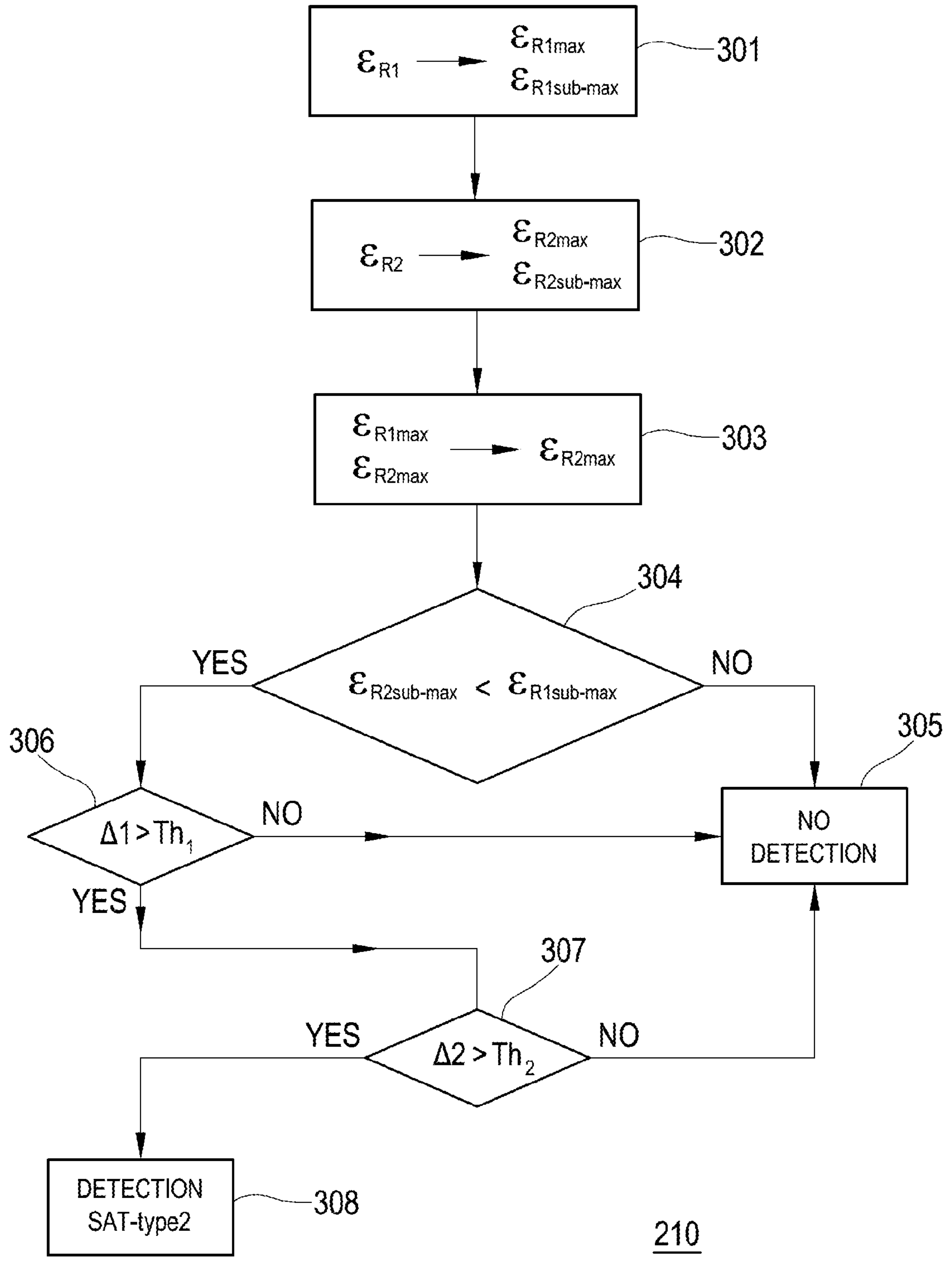
FIG. 3 is a flow diagram of some steps useable by said exemplifying method of detecting the type of a satellite.

FIG. 3 shows, by a flow diagram, an example of an embodiment of the analysis step 210. It is observed that at the end of the first and second error calculation steps 208 and 209 a first plurality or series of errors $\epsilon_{R1}(t_k)$ $t_k\epsilon TV_1$ and second plurality or series of errors $\epsilon_{R2}(t_k)$ $t_k$ $\epsilon TV_2$ are available as indicated in formulas (7) and (8).

Analysis step 210 comprises a first selection step 301 which selects a first maximum error $\epsilon_{R1max}$ by selecting the maximum in absolute value among the first series of errors $\epsilon_{R1}(t_k)$. Such first selection step 301 can also select a first sub-maximum error $\epsilon_{R1sub\text{-}max}$ obtained as a maximum value among those of the first series of errors $\epsilon_{R1}(t_k)$ in absolute value, without the first previously selected maximum error $\epsilon_{R1max}$.

Moreover, the analysis step 210 comprises a second selection step 302 which selects a second maximum error $\epsilon_{R2max}$ by selecting the maximum in absolute value among the second series of errors $\epsilon_{R2}(t_k)$. Such second selection step 302 can also select a second sub-maximum error $\epsilon_{R2sub\text{-}max}$ obtained as maximum value among those of the second series of errors $\epsilon_{R2}(t_k)$ in absolute value, without the second previously selected maximum error $\epsilon_{R2max}$. It is also possible to select both for the first series ϵR1(tk) and for the second series $\epsilon_{R2}(t_k)$ further sub-maximum values smaller than the previous ones.

Then, a selection step 303 selects the smaller, in absolute value, between the first and second maximum errors; for example, it is supposed that the smaller is the second maximum error $\epsilon_{R2max}$. According to a particular example, it could be detected as a type of the satellite S1 a type associated with the smaller between the first and second maximum errors, so that the analysis step 210 ends with a succeeded detection of the type of first satellite S1.

According to the embodiment shown in FIG. 2, analysis step 210 continues to a verification step 304 which analyses the sub-maximum errors and verifies if the second sub-maximum error $\epsilon_{R2sub\text{-}max}$ (that is the sub-maximum error associated to the maximum error resulted as the greater in the selection step 303) is smaller (in absolute value) than the first sub maximum error $\epsilon_{R1sub\text{-}Max}$:

$$|\epsilon_{R2sub\text{-}max}|<|\epsilon_{R1sub\text{-}max}| \quad (9)$$

In case relation (9) is not true, analysis step 210 ends with a failed detection step 305 of the type of first satellite S1.

In case relation (9) is true (branch Yes) it continues to a first comparison step 306, which compares a first difference Δ1 between the second and first maximum errors, with a first threshold value Th1 for evaluating if the difference is greater or smaller than said first threshold value:

$$\Delta 1=|\epsilon_{R1max}-\epsilon_{R2max}| \quad (10)$$

$$\Delta 1>Th1 \quad (11)$$

In case the first difference Δ1 is not greater (branch No) than the first threshold Th1, the analysis step 210 ends with the failed detection step 305.

In case the first difference Δ1 is greater (branch Yes) than the first threshold value Th1, it continues to a second comparison step 307. According to another embodiment, it is possible to conclude the analysis step 210 with a succeeded detection of the second type of first satellite S1 without performing the second comparison step 307.

The second comparison step 307, if is provided, compares a second difference Δ2 between the second and first sub-maximum errors with a second threshold value Th2 for evaluating if the difference is greater or smaller than said second threshold value:

$$\Delta 2=|\epsilon_{R1sub\text{-}max}-\epsilon_{R2sub\text{-}max}| \quad (12)$$

$$\Delta 2>Th2 \quad (13)$$

In case the second difference Δ2 is not greater than second threshold Th2 (branch No), analysis step 210 ends with the failed detection step 305.

In case the second difference Δ2 is greater than the second threshold Th2 (branch Yes), analysis step 210 ends with a succeeded detection step 308 (Detection) of the type of the first satellite S1 and, in other words, according to the described example, with the detection of the second type SAT-type 2.

It is observed that in case a plurality of N sub-maximum errors are selected, second comparison step 307 is performed for the plurality of N sub-maximum errors, and the detection step 308 is performed only if it is satisfied relation (13) for each of such sub-maximum errors.

Moreover, it is observed that when analysis step 210 ends with the failed detection step 305, detecting method 200 (FIG. 2) can be repeated by using other ephemerides data referred to other time intervals.

In order to further improve the reliability of the detection method 200, the detection method 200 can be repeated during time intervals extending even more forward, in order to have the availability of a plurality of results and select therefore the more recurrent result. For example, it is considered a starting time period of 18 weeks (that is about 4 months). Applying a time translation of two weeks for five times, the following time periods are defined:

period No. 1 starting week 0 and ending week 18;
period No. 2 starting week 2 and ending week 20;

period No. 3 starting week 4 and ending week 22;
period No. 4 starting week 6 and ending week 24;
period No. 5 starting week 8 and ending week 26.

For each of the five above mentioned periods, the detection method 200 is applied, in order to obtain a succeeded detection result or a failed detection result. By selecting as final result the one repeating with greater frequency (the more recurrent result) the reliability of the detection method is improved.

It is observed the steps included in the above mentioned detection method 200 and analysis step 210 can correspond to respective software modules included in the satellite type detection module 9 and configured in order to implement the described procedure.

It is observed that the described detection method 200 enables to substantially improve the prediction of orbits with respect to the known prior techniques, without a relevant increment of the computational load on the receiving apparatus 100 and without requiring outside updates of the apparatus 100 itself.

The Applicant has done experimental tests by considering two types of satellites: GPS block II-A and GPS block II-R. Further, two ephemerides (36 hours apart) per week during a period of 120 days have been considered for these experimental tests. The experiment was performed on two distinct years (2009 and 2012) by performing 240 tests each year.

As a model of solar radiation pressure the Y. Bar-Sever and D. Kuang model (http://ipnpr.jpl.nasa.gov/progress_report/42-159/1591.pdf) has been considered, described in the above mentioned article.

The results of the experimental tests are represented in the following table:

| Year | Reliability | Probability of a detection | Probability of a failed detection | Probability of a correct detection | Probability of a false detection |
|---|---|---|---|---|---|
| 2009 | 98.24% | 73.70% | 26.30% | 71.94% | 1.76% |
| 2012 | 99.18% | 74.70% | 25.30% | 73.88% | 0.82% |

wherein:

Reliability is given by: a number of correct detections+number of failed detections/total number of performed tests;

number of detections is given by: number of correct detections+number of false detections;

probability of detection is given by: number of detections/total number of performed tests;

probability of failed detection is given by: number of failed detections/total number of performed tests;

probability of correct detection is given by: number of correct detections/total number of performed tests;

probability of failed detection is given by: number of failed detections/total number of performed tests.

As it is apparent from the shown table, the reliability and also the probability of correct detection of the described detection method are very high.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of predicting an orbit of a satellite of a satellite positioning system, the method comprising:

receiving a satellite positioning signal from the satellite at an antenna of a receiving apparatus;

using a processor and a memory cooperating therewith to associate first and second models of celestial mechanics forces with first and second types of satellites, respectively;

store first ephemerides data of a satellite, associated with first time intervals, and second ephemerides data of the satellite, associated with second time intervals distinct from the first time intervals;

calculate reference satellite positions based on the first ephemerides data;

estimate first and second satellite positions in the first time intervals by using the second ephemerides data and the first and second forces models, respectively;

determine first and second estimate errors by comparing the reference positions with the first and second positions, respectively;

detect the type of satellite between the first and second types by an analysis of the first and second errors;

perform predictions of the satellite orbit by using one among the first and second forces models as a function of the detected type of satellite; and using the predicted satellite orbit and the received satellite positioning signal, calculating the distance between the receiving apparatus and the satellite.

2. The method according to claim 1, wherein the first time interval is before the second time interval.

3. The method according to claim 1, wherein first and second satellite types are respectively associated with a first shape and/or size and/or mass of the satellite and to a different second shape and/or size and/or mass of the satellite.

4. The method according to claim 1, wherein:

the first and second celestial mechanics forces models are dependent on a respective solar radiation pressure model acting on the satellite of the first and second types.

5. The method according to claim 1, wherein detecting the type of satellite comprises:

signaling the succeeded detection of the type; and signaling a failed detection of the type.

6. The method according to claim 5, wherein said analysis of the first and second errors comprises:

selecting at least one first maximum error among said first errors in absolute value and at least a second maximum error among said second errors in absolute value;

comparing the first maximum error with the second maximum error and identifying a first smaller value among said first and second maximum errors; and selecting the first or second type as a function of said first smaller value identification.

7. The method according to claim 6, further comprising using the processor and the memory cooperating therewith to:

define the absolute value of a first difference between the first maximum error and second maximum error;

compare the absolute value of the first difference with a first threshold value; and signal the succeeded or failed detection of the type based on said comparison.

8. The method according to claim 7, further comprising using the processor and the memory cooperating therewith to:

select at least one first sub-maximum error defined as a maximum value among said first errors in absolute value devoid of the first maximum error and at least one second sub-maximum error defined as a maximum value among said second errors in absolute value devoid of the second maximum error.

9. The method according to claim 8, further comprising using the processor and the memory cooperating therewith to:

compare the first sub-maximum error with the second sub-maximum error and identifying a second smaller value between said first and second sub-maximum errors; and wherein signaling the failed detection of the type is based upon the first smaller value and the second smaller value.

10. The method according to claim 9, further comprising using the processor and the memory cooperating therewith to:

define the absolute value of a second difference between the first sub-maximum error and second sub-maximum error; and compare the absolute value of the second difference with a second threshold value; and wherein signaling further comprises signaling the succeeded or failed detection of the type based on said comparison of the second difference with the second threshold value.

11. The method according to claim 1, wherein:

the first and second errors comprise first and second radial errors.

12. The method according to claim 5, further comprising using the processor and the memory cooperating therewith to:

obtain a plurality of results of succeeded detection wherein one between the first and second types is selected and a plurality of results of failed detection; said plurality of results being relative to partially overlapping and time forward shifted time intervals; and select a result among the pluralities of results of succeeded detection and failed detection having a greater recurrence.

13. A method of detecting a type of a satellite of a satellite positioning system, the method comprising:

receiving a satellite positioning signal from the satellite at an antenna of a receiving apparatus;

using a processor and a memory cooperating therewith to:

associate first and second celestial mechanics force models with first and second types of satellites, respectively;

store first ephemerides data of a satellite, associated with a first time interval, and second ephemerides data of the satellite, associated with a second time interval distinct from the first time interval;

calculate reference satellite positions based on the first ephemerides data;

estimate first and second satellite positions in the first time interval by using the second ephemerides data and the first and second forces models, respectively;

determine first and second estimate errors by comparing the reference positions with the first and second positions, respectively;

detect the type of the satellite between the first and second type by an analysis of the first and second errors; and using the detected satellite type and the received satellite positioning signal, calculate the distance between the receiving apparatus and the satellite.

14. A receiving apparatus of a satellite positioning system comprising:

an antenna for receiving a satellite positioning signal from a satellite of the satellite positioning system;

a processor and a memory storing a program to be executed in the processor, the program comprising instructions to:

associate with first and second satellite types first and second models of celestial mechanics forces, respectively;

store first ephemerides data of the satellite associated with first time intervals, and second ephemerides data of the satellite associated with second time intervals distinct from the first time intervals, calculate reference positions of the satellite based on the first ephemerides data, estimate first and second positions of the satellite in the first time intervals by using the second ephemerides data and the first and second forces models, respectively;

determine first and second estimate errors by comparing the reference positions with first and second positions, respectively;

detect the type of the satellite between the first and second type by an analysis of first and second errors;

perform predictions of an orbit of the satellite by using one among the first and second forces models as a function of the detected type of satellite; and using the predicted orbit of the satellite and the received satellite positioning signal, calculate the distance between the receiving apparatus and the satellite.

15. The method according to claim 13, wherein the first time interval is before the second time interval.

16. The method according to claim 13, wherein the first and second satellite types are respectively associated with a first shape and/or size and/or mass of the satellite and to a different second shape and/or size and/or mass of the satellite.

17. The method according to claim 13, wherein the first and second celestial mechanics forces models are dependent on a respective solar radiation pressure model acting on the satellite of the first and second types.

18. The apparatus according to claim 14, wherein the first time interval is before the second time interval.

19. The apparatus according to claim 14, wherein the first and second satellite types are respectively associated with a first shape and/or size and/or mass of the satellite and to a different second shape and/or size and/or mass of the satellite.

* * * * *